US008944315B2

(12) United States Patent
Schneider (10) Patent No.: US 8,944,315 B2
(45) Date of Patent: Feb. 3, 2015

(54) APPARATUS AND METHOD FOR WORKING AN OPTICAL LENS AND ALSO AN OPTICAL LENS AND A TRANSPORTING CONTAINER FOR OPTICAL LENSES

(75) Inventor: Gunter Schneider, Marburg (DE)

(73) Assignee: Schneider GmbH & Co. KG, Fronhausen (DE)

( * ) Notice: Subject to any disclaimer, the term of this patent is extended or adjusted under 35 U.S.C. 154(b) by 0 days.

(21) Appl. No.: 13/702,164

(22) PCT Filed: Sep. 29, 2011

(86) PCT No.: PCT/EP2011/004867
§ 371 (c)(1),
(2), (4) Date: Dec. 5, 2012

(87) PCT Pub. No.: WO2010/045411
PCT Pub. Date: Apr. 12, 2012

(65) Prior Publication Data
US 2013/0075465 A1      Mar. 28, 2013

(30) Foreign Application Priority Data

Oct. 4, 2010    (EP) .................................... 10013265
Nov. 5, 2010    (EP) .................................... 10014335
Nov. 17, 2010   (EP) .................................... 10014693

(51) Int. Cl.
*G06F 19/00*        (2011.01)
*G06K 19/00*        (2006.01)
(Continued)

(52) U.S. Cl.
CPC ................ *G06F 17/00* (2013.01); *B24B 13/06* (2013.01); *B23B 5/00* (2013.01); *B23C 3/00* (2013.01); *B23Q 17/00* (2013.01); *B23Q 17/002* (2013.01); *B23Q 17/007* (2013.01); *B24B 13/00* (2013.01); *B65D 85/00* (2013.01); *G06K 19/041* (2013.01);
(Continued)

(58) Field of Classification Search
CPC ........ B24B 9/148; B24B 13/00; B24B 13/06; B24B 9/14; B24B 51/00
USPC .......... 235/375, 385, 487, 494; 451/5, 10, 11, 451/42
See application file for complete search history.

(56) References Cited

U.S. PATENT DOCUMENTS 5,485,399 A    1/1996  Saigo et al.
5,808,894 A    9/1998  Wiens et al.
(Continued)

FOREIGN PATENT DOCUMENTS

DE    10 2006 050 426 A1    4/2008
DE    10 2007 007 188 A1    8/2008
(Continued)

*Primary Examiner* — Thien M Le
*Assistant Examiner* — Claude J Brown
(74) *Attorney, Agent, or Firm* — Roberts Mlotkowski Safran & Cole, P.C.; David S. Safran (57) ABSTRACT

A device and a method for processing an optical lens are proposed, whereby lens-production data and/or geometric data of the lens are determined from desired optical data of the lens when a corresponding activation code is acquired. Preferably, the lens or a block piece and/or an assigned shipping container is/are provided with the activation code and/or other information relative to the lenses that are to be processed.

42 Claims, 4 Drawing Sheets

(51) Int. Cl.

| | | |
|---|---|---|
| *G06K 19/06* | (2006.01) | |
| *G06F 17/00* | (2006.01) | |
| *B24B 13/06* | (2006.01) | |
| *B23B 5/00* | (2006.01) | |
| *B23C 3/00* | (2006.01) | |
| *B23Q 17/00* | (2006.01) | |
| *B24B 13/00* | (2006.01) | |
| *B65D 85/00* | (2006.01) | |
| *G06K 19/04* | (2006.01) | |
| *G06K 19/067* | (2006.01) | |

(52) U.S. Cl.
CPC ........ *G06K 19/06046* (2013.01); *G06K 19/067* (2013.01)
USPC ................. 235/375; 235/385; 451/5; 451/10; 451/11; 451/42

(56) References Cited

U.S. PATENT DOCUMENTS

| | | | |
|---|---|---|---|
| 5,967,879 A * | 10/1999 | Gottschald | 451/5 |
| 6,074,281 A * | 6/2000 | Swanson et al. | 451/42 |
| 6,659,098 B1 | 12/2003 | Sekiya | |
| 6,785,585 B1 | 8/2004 | Gottschald | |
| 6,813,536 B1 | 11/2004 | Gottschald | |
| 7,111,938 B2 | 9/2006 | Andino et al. | |
| 7,437,809 B2 * | 10/2008 | Yamamoto et al. | 29/26 A |
| 7,476,143 B2 | 1/2009 | Shibata | |
| 2004/0032565 A1 * | 2/2004 | Yamakaji et al. | 351/177 |
| 2005/0077639 A1 * | 4/2005 | Foreman et al. | 264/1.38 |
| 2005/0255406 A1 * | 11/2005 | Assa | 430/270.1 |
| 2005/0280542 A1 * | 12/2005 | Shieh | 340/572.8 |
| 2006/0061476 A1 * | 3/2006 | Patil et al. | 340/572.4 |
| 2006/0164236 A1 * | 7/2006 | Siegl et al. | 340/539.13 |
| 2006/0286903 A1 * | 12/2006 | Tanaka | 451/5 |
| 2007/0141950 A1 * | 6/2007 | Shibata et al. | 451/5 |
| 2008/0026679 A1 * | 1/2008 | Siders et al. | 451/42 |
| 2008/0051012 A1 | 2/2008 | Akiyama et al. | |
| 2008/0055542 A1 * | 3/2008 | Haddadi | 351/177 |
| 2008/0132147 A1 | 6/2008 | Takeichi | |
| 2008/0132157 A1 | 6/2008 | Schneider et al. | |
| 2009/0067940 A1 | 3/2009 | Arai et al. | |
| 2009/0302122 A1 | 12/2009 | Begon | |
| 2010/0224039 A1 | 9/2010 | Schneider et al. | |
| 2010/0248590 A1 | 9/2010 | Shibata et al. | |
| 2010/0250173 A1 * | 9/2010 | Kozu | 702/82 |
| 2011/0009035 A1 | 1/2011 | Schneider | |
| 2011/0096290 A1 | 4/2011 | Schneider et al. | |
| 2011/0220519 A1 | 9/2011 | Meschenmoser et al. | |
| 2011/0256806 A1 | 10/2011 | Monnoyeur | |
| 2011/0320029 A1 | 12/2011 | Buchet et al. | |
| 2012/0314186 A1 * | 12/2012 | Levraud et al. | 351/159.75 |

FOREIGN PATENT DOCUMENTS

| | | | | |
|---|---|---|---|---|
| DE | 102008041945 | * | 3/2010 | B65D 85/38 |
| EP | 0 849 038 A2 | | 6/1998 | |
| EP | 1 295 962 A1 | | 3/2003 | |
| EP | 1 955 811 A2 | | 8/2008 | |
| JP | 2-172643 A | | 7/1990 | |
| WO | 01/53038 A1 | | 7/2001 | |

* cited by examiner

APPARATUS AND METHOD FOR WORKING AN OPTICAL LENS AND ALSO AN OPTICAL LENS AND A TRANSPORTING CONTAINER FOR OPTICAL LENSES

BACKGROUND OF THE INVENTION

1. Field of the Invention

This invention relates to an apparatus for processing an optical lens, an optical lens, a shipping container for one or more optical lenses, as well as a method for processing an optical lens.

2. Description of Related Art

An optical lens, for example for eyeglasses, is to have certain optical properties. The associated desired optical data of the lens are determined by, for example, an optician. These data comprise, for example, the indication of diopters, data regarding sphere and cylinder, pantoscopic angle, etc. In addition, these desired optical data can also contain the distance from and/or the position relative to an assigned eye, in particular in the case of incorporation in a certain eyeglass frame, i.e., e.g., the pantoscopic angle, facial angle or face form angle, interpupillary distance, etc.

In the past, lenses with predetermined optical data, for example with diopters available in various stages, were used. To an increasing extent, however, lenses are used that have the individualized optical data that are desired in each case or the associated optical properties. Such lenses are then processed or finished based on the optical data that are desired in each case, whereby the lenses are provided in particular with so-called free-form surfaces (for example, progressive-addition lenses, etc.). The description below and this invention relate to those lenses or lens blanks that are processed according to the desired, individualized optical data and are provided in particular with the thus mentioned free-form surfaces.

At present, the desired optical data are usually relayed to a large-scale operation, such as a central laboratory, or the like, where the corresponding geometric data of the lens are determined from the desired optical data by means of a design model in a central processing device that is separate and independent from the processing machines. The thus obtained geometric data of the lens are relayed to a central processing and sequence control unit. Subsystems then generate corresponding processing orders with production data for various processing machines to process the lenses based on the specific geometric data. In addition to the partial problematic transfer of the desired optical data from the optician to the large-scale operation, this data processing requires extraordinarily high hardware, software and machine expenses; in particular, usually corresponding servers and computer networks are used for this purpose. In addition, the operation requires the use of specially trained staff. Consequently, labor costs are also high.

With respect to the cost that has been necessary to date and the necessary integration of server systems, etc., into computer networks or the Internet, reference is made by way of example to U.S. Pat. No. 5,808,894 A, US 2004/0246440 A1, and WO 2010/040757 A1.

The above-explained, complex and multi-stage organization of the processing of optical lenses has already been improved relative to the processing sequence. DE 10 2007 007 188 A1 discloses a processing center for processing an optical lens that is made of plastic. This processing center has a workpiece spindle that rotates around a rotational axis, with a receptacle for a lens. The processing center also has a processing device with a milling tool, a processing device with a turning tool, a polishing device, a cleaning device, and an engraving device. The workpiece spindle can be moved in the direction of the rotational axis and crosswise thereto to feed the lens to the different devices and to make possible the various processing work and in this case in particular to generate the desired free-form surfaces on the lenses.

In DE 10 2007 007 188 A1, there is no mention of a control unit of the processing center. It can be assumed from this, however, that the processing center has a computer-supported control device, such as a CNC control unit, so that the different devices can operate in the usual way corresponding to the preset production data. To operate, the known processing center then has to be connected accordingly to a computer network or the like for the preparation of the production data.

DE 198 04 542 A1 relates to the edge processing of an eyeglass lens. From input optometric data, eyeglass frame data, data for visual centers of the eyes, and additional customer data, raw glass is calculated on a computer with respect to the necessary diameter, the radii of the optical front surface and rear surface as well as the optimum center thickness, based on the type of eyeglass material, and relayed via remote data transmission to an eyeglass lens manufacturer for the purpose of creating a raw glass. The raw glass that is delivered by the glass manufacturer is then finished by shape processing or shape grinding. This means that the edge of the raw glass is adapted to the eyeglass frame and in this connection is optionally provided with a bevel, a groove or a bezel. In DE 198 04 542 A1, the shape processing relates to the edge processing. In this case, DE 198 04 542 A1 also discloses an optional processing of an optical surface of the raw glass, but without indicating details in this regard. Based on the context and the structure of the grinding device shown in DE 198 04 542 A1, in this case, this is obviously a processing of the edge, but not a processing of the front side or rear side to achieve desired optical values or properties in the eyeglass frame.

DE 198 04 542 A1 discloses a transfer of data onto data media, by means of a scanner or a sensor for transferring data, for example in the form of a bar code, an eyeglass lens, an eyeglass frame, or a shipping container for eyeglass lenses. In addition, a corresponding input device for input of corresponding data is also provided. DE 198 04 542 A1 does not deal with the determination of geometric data from optical data in detail and consequently also does not provide any indication relative to a necessary release for such a determination.

EP 1 894 673 A1 and US 2008/0055542 A1 relate to the adaptation of lenses to an eyeglass frame. The lenses are held by a block piece, which is provided with an electronic identification element, in particular an RFID element, which for its part contains an identification code. Lens data of the lens held by the block piece is assigned to the identification code. These lens data can be called up by means of the identification code of a computer and used for the processing of the lens to adapt it to the frame. Here, however, there is no shape-imparting processing of a front side or rear side of the lens.

WO 2006/046558 A1 and EP 1 847 869 A1 relate to the edge processing of eyeglass lenses. A determination of geometric data or production data from desired optical data is not carried out. Accordingly, there is also no indication with respect to a release of such a determination. Rather, here there is the adaptation of an eyeglass lens to an eyeglass frame.

US 2009/0302122 A1 discloses a lens with a hologram, which contains data for identification and/or other information, optionally in coded form.

DE 10 2008 041 954 A1 discloses a shipping container for eyeglass lenses with a transponder or chip for identification.

DE 201 16 824 U1 relates to a device for handling a lens, whereby the device can have a coding with all information pertaining to a work order. As coding, a data storage unit can be used, which can be read optically, magnetically, or electronically.

SUMMARY OF THE INVENTION

The object of this invention is to indicate an apparatus, an optical lens, a shipping container for optical lenses, and a method for processing an optical lens, whereby processing can be done in particular on the spot, for example right in an optician's office or the like, and/or at low organizational expense.

The above object is achieved by an apparatus, an optical lens, a shipping container, and a method as described herein.

Within the scope of this invention, the term desired "optical data" relates to the optionally highly individualized optical data of the lens that are determined for the respective patients, which are typically determined by an optician, or to the optical nominal data of the lens that is to be produced. In particular, in this invention, the "optical data" comprise the spherical optical action, for example in diopters, information regarding a cylinder for correcting astigmatism (for example, thickness of the curvature, in particular in diopters and position of the cylindrical axis, for example in degrees), information regarding a prism, in particular for correcting strabismus (for example, tilting or thickness of the prism, position and shape of the prism, axis of the prism, or the like), information regarding a near and/or far range, the interpupillary distance (distance between the eyes for the positioning of the lenses in the eyeglass frame), the fitting height (height from the lower edge of the lens to the center of the eye), the edge shape (for example round, indicating the diameter, or oval, indicating the minor and major axes of the ellipse or some other shape) and/or information regarding the angular position of the lens relative to the eyes or in the eyeglass frame (pantoscopic angle, face form angle to indicate the slope of the lens plane relative to the optical axis of the eye in the horizontal, etc.).

According to the invention, the term "geometric data" of the lens refers to the data or values that describe the geometric properties of the lenses, such as diameter, thickness, optionally at various points, radius of an optical surface or surface side, curvature in particular at various points, etc. The "geometric data" represent in particular the data or values that should or must have the (finished) processed lens or a surface of the lens to achieve the desired optical data or properties. The geometric data can refer, for example, only to one side, such as the front side or rear side of the lens, or at least to a side that is just about to be processed or finished, but also to both sides, the edge and/or the thickness or the thickness variation of the lens. For example, the geometric data can indicate or specify a desired surface variation or a desired surface shape, in particular a surface side, which is to be finished, of the lens that is to be processed. This can be carried out by, for example, corresponding parameters, such as the radius of a sphere and/or a torus, by a function, an approximation, by coordinate values, by CAD data and/or values corresponding thereto, or the like. The geometric data can also comprise, for example, a thickness, various thickness values, or a thickness variation of the lens that is to be finished. The geometric data can also comprise an edge path, in particular in the lens plane along the edge, and/or an edge shape, for example the design of one or more bezels along the edge, and/or the design of a groove (position, shape) along the outer edge, or the like. The geometric data are in particular data of the lens that is to be finished, i.e., threshold data or threshold values, or the like, even when partially only an approximation and not a complete mathematical description or functional representation is possible.

In particular, the geometric data thus relate at least to a surface or surface side that is essential for the optical function in particular as an eyeglass frame and/or for reaching the desired optical data, especially preferably the front side and/or rear side, the lens or the finished lens. This invention in particular deals with the production of lenses with free-form surfaces, whereby "free-form surfaces" in terms of this invention are distinguished in particular in that no closed mathematical representation or only an approximate mathematical representation, for example by bicubic or higher splines, or the like, is possible. Especially preferably, the front side and/or rear side that is to be finished or processed is such a free-form surface.

According to the invention, the term "production data" refers in particular to the data with which preferably a specific processing device is actuated to implement a specific processing process. These are in particular data that control the movement of corresponding processing tools and/or corresponding processing processes. For example, the production data can be so-called CNC data, or the like. As an alternative or in addition, for example, the production data can also represent or comprise and contain geometric data from intermediate steps in the processing or different processing processes and/or optionally completely replace the geometric data.

In addition, the geometric data and/or production data also contain or take into consideration a certain oversize or a possible undersize—in particular with respect to the subsequent processing steps, such as grinding, polishing, or coating.

According to the invention, "design model" is defined in particular as that which is called "lens design" among experts. The design model can be specific to a distributor of lens blanks. In particular, it comprises all of the algorithms or essential algorithms with which the geometric data of the special lenses are established or determined or approximated from the desired optical data. The geometric data depend in particular on the lens material, the refractive index, size, shape, thickness, lens type, manufacturer and/or the type of binding, or the like (the latter or similar information that relates in particular to the lens blank or the lens in the initial state or before the processing and/or an unambiguous identification are preferably referred to, according to the invention, as "output data," which in particular are lens-specific), and/or optionally on possible approximations of the design model. On the way from the lens blank to the finished lens, optionally various methods can also be pursued. The specifically selected processing method of the respective manufacturer of the lens blank and/or the processing machine is electronically usable or is taken into consideration in particular in the design model and/or in the generation of the production data.

The "design model" can also be defined according to the invention as a synonym for an algorithm or set of rules for determining or generating—in particular by calculation or approximating a front side or rear side of the lens that is to be processed—the geometric data or production data, especially preferably for production or processing of a front side and/or rear side of the lens to be produced, based on the desired optical data and in particular based on output data, which contain in particular at least the shape of an already finished rear side or front side of a lens that is to be processed.

Within the scope of this invention, "processing device" in general is defined as any device that provides or allows for a processing (working) of the lens. In this respect, the term "processing device" also comprises a polishing device, a cleaning device, and/or an engraving device. In special cases, however, there is also the concept of "processing device for cutting processing (machining) or other shape-giving processing (working) of the lens." These are in particular the above-indicated special processing devices with a milling tool, with a turning tool, or with another shape-giving processing tool.

A first aspect of this invention lies in the fact that the apparatus for processing an optical lens, in particular by means of an acquisition device, acquires an activation code for determining geometric data and/or production data of the lens from desired optical data of the lens. As an alternative or in addition, lens-specific output data are acquired. Especially preferably, the acquisition is achieved in an automatic or self-actuating manner. This allows for a very simple processing of the lens, in particular on the spot, and/or at low organizational expense.

According to a second aspect of this invention, the lens is provided with such an activation code and/or lens-specific output data. As an alternative or in addition, a shipping container for one or more optical lenses can thus be provided. This allows in turn a simplified handling or processing, in particular on the spot, and/or makes possible a reduction of the organizational expense.

According to a third aspect of this invention, a determination of geometric data and/or production data of the lens from desired optical data, in particular by means of a design model, is achieved only with the presence or acquisition of a permissible activation code. In addition or as an alternative, in this case, the output data can also be taken into consideration. In turn, this facilitates the handling or processing in particular on the spot and/or reduces the organizational expense.

The acquisition device is preferably integrated into the apparatus.

The acquisition of the activation code and/or the output data is achieved in particular optically, magnetically and/or electromagnetically, for example by acquiring a bar code and/or communicating with an information medium, such as an RFID chirp or RFID transponder. This allows for a very simple production.

According to the invention, the term "information" that is partially used below preferably comprises an activation code in the above-mentioned sense and/or output data and/or other data that are relevant for the processing for the respective lens or for a group of in particular similar or identical lenses. This information or parts thereof is/are preferably stored or contained in an information medium. The information medium can be or can contain in particular a so-called RFID transponder (chip or device for identification using electromagnetic waves, derived from the English term "Radio-Frequency-Identification") or an optical identification, such as a bar code, in particular a 2D bar code (two-dimensional bar code).

Preferably, the apparatus for processing an optical lens has not only a processing device for cutting or other shape-giving processing of the lens and optionally a polishing device for polishing the lens, but also an input device for the desired optical data of the lens. The control device of the apparatus is designed to generate lens-production data from the input desired optical data and/or to determine geometric data of the lens from the desired optical data.

In a simple way and at low cost, in particular also by less trained staff and/or on the spot and/or without connection to a host computer and/or without ordering raw glass, an (immediate) processing of the lens or a directly available lens can be achieved in such a way that the finished lens has the desired optical data and thus the desired optical properties. The desired optical data of the lens that is to be produced that are determined by the optician can be introduced in a simple way. An operator needs to input only these data and optionally output data (starting data) from the lens that is to be processed or the lens blank to produce the lens with the desired optical properties. The additional data sets, which are subordinate to the desired optical data, are produced by the device itself.

The input device preferably has a control panel for manual input of the desired optical data. This allows for a very simple input and can be achieved at low cost. A control panel for manual input of the desired optical data is in particular a keyboard or a touchscreen.

As an alternative or in addition, the input device can be used for the input of information, in particular the activation code.

As an alternative or in addition, the input device can also have an interface for an electronic input or receptacle of the desired optical data, in particular directly from a measuring device, computer, or the like.

Preferably, the input device or device, in particular for a menu navigation of the user, also has a display device, in particular in the form of a dialog box or a screen, possibly equipped as a touchscreen. By means of the menu navigation, a user can operate the device via the control panel in a simple way, in particular without special instruction.

The apparatus or control device preferably has a design module with a design model for determining geometric data of the lens from the desired optical data in a determination process. This represents a significant simplification relative to the state of the art. In particular, an integration of the design module or design model (lens design) is provided in a machine control unit of a processing device. This simplifies the structure and reduces the cost to an extraordinary extent.

"Design module" is defined in particular as a data-processing device, computing device or computing unit, which can be formed or produced especially preferably by a separate computer and/or by software or a computer program, or the like.

The design module is used to determine the geometric data of the lens and/or the generation of production data. In this connection, the design module uses at least one design model in the already mentioned sense. The design model can be completely preset, programmed and/or changeable as desired. If necessary, several or different design models can also be used.

The design model can especially preferably be preset, programmed and/or changed. This allows for a universal use and/or an adaptation to the respective conditions and various lenses, lens manufacturers and/or customer demands.

According to one variant, the design model can be selected to determine geometric data of the lens from the desired optical data from several design models—in particular automatically based on the lens or on the lens type or lens blank. This allows for an optimum adaptation or selection.

"Determination process" is preferably defined as the determination of the geometric data or generation of production data for a lens that is to be processed. In this connection, several determination or generation steps can also be performed or occur. These are defined, evaluated, counted or acquired altogether as a single determination process if the latter all refer to the same lens.

The apparatus or control device preferably has a production module for generating production data at least for a processing device of the device and, once there, for the polishing device from the previously determined geometric data of the lens. Thus, at low cost, a direct further processing of the specific geometric data can be carried out. In particular, transfer problems can be avoided. This further simplifies the operation and handling.

"Production module" is defined in particular as a data-processing device, computing device or computing unit, which can be formed or produced especially preferably by a separate computer and/or by software or a computer program, or the like.

As already mentioned above, the production module can be eliminated or can be integrated into the design module when the design module is generated directly or else the (necessary) production data are generated. As an alternative or in addition, however, at least one production module can also be provided for generating production data.

In terms of this invention, an "activation code" is preferably a code that is necessary for activation or release for the processing or for the determination of geometric data and/or production data of the lens from the desired optical data or for use of the design module or a design model and/or the production module. In principle, it is also possible that the activation code in general is necessary for use of the device or for processing an optical lens, even independently of the use of a design module or design model and/or production module.

The activation code is in particular a multi-digit alphanumeric character string.

After acquisition of an activation code—preferably in the apparatus or control device—it is checked whether this is a permissible activation code. This is carried out in particular by comparing indicated or acquired activation codes with permissible activation codes, which are preferably stored in the apparatus or are present in some other way or can be generated. Only in the case where the input or acquired activation code coincides with one of the permissible activation codes is a determination of geometric data or production data from the desired optical data or a determination process for a lens allowed. Then, the permissible activation code is preferably marked as unacceptable or deleted, in particular to avoid a repeated use of the activation code. However, it can also be possible in principle that a permissible activation code can be used for several determination processes, for example for two or more determination processes, and, consequently, multiple use is permissible.

The testing of the activation code is carried out especially preferably in the control device or by means of a comparator or comparing means or in some other suitable way, especially preferably in the device.

After the determination of the geometric data or production data, the actual shape-giving or cutting processing (machining) of the lens, in particular a front side and/or rear side of the lens, can be done, in particular to reach the desired optical data—i.e., the desired optical values or properties for a subsequent user—in the lens.

The apparatus is especially preferably designed as a compact processing center. In principle, DE 10 2007 007 188 A1 already shows a device in the form of a processing center. There, however, nothing is explained regarding the control device and the input device.

The apparatus according to the proposal in particular has a common housing for at least one processing device of the device as well as for other optional devices for polishing, cleaning, marking and/or locking. This allows for an especially compact and/or economical structure and/or a simplification of the expense, the control, and/or the operation. Otherwise necessary external interfaces for transfer of data or transmission of information can also be minimized or completely avoided.

The control device, the design module, the input device and/or the acquisition device is/are especially preferably integrated into the apparatus or connected to the latter. This corresponds to the preferred formal principle of the compact processing center according to the proposal. However, the control device and/or input device according to a variant embodiment can also be designed as a separate component or subassembly that in particular can be connected directly to the device and that then is designed preferably but decidedly for the device and can be connected very simply and in particular exclusively to the latter.

A configuration of the apparatus, in which the lens or the lens blank, in particular locked on a block piece, can be manually inserted into or clamped onto the processing device and, once there, can be put into the polishing device and can be removed again from the latter, is especially advantageous. The same is true here in particular also for the cleaning device. This corresponds to a simple design that can be easily handled at the site where the device is used. As a result, the costs of the apparatus are considerably dropped, since costly, complicated handling devices for the lens or the lens blank, preferably on the block piece, can be eliminated.

Information or a portion of the information or a thus provided information medium are especially preferably assigned to the lens or a protective film with which the lens is provided, or a block piece, which carries the lens. The information or the information medium is especially preferably carried by the protective film or can be inseparable from it. As an alternative or in addition, a shipping container can be provided with the information or a portion of the information or the information medium that contains the information.

A preferred method for processing an optical lens is distinguished in that a lens that is to be processed, in particular, i.e., a lens blank, is fed to an apparatus, and desired optical data of the lens are input into the apparatus, whereby an activation code is detected and only in a permissible activation code, geometric data of the lens are determined from the desired optical data and production data are generated therefrom or direct production data are generated, and the lens is processed based on the generated production data from the device. An external influence or disruption of the determination of the geometric data, the generation of the production data, the data-processing and/or the data transfer to the processing device(s) after the input of the optical data and/or optionally after a start-up or an optional initial release, is/are especially preferably no longer possible. This allows for a processing of lenses on the spot at low cost, whereby the operation is significantly simplified and can be reduced in particular to the direct input of the desired optical data and optionally information.

Preferably, a cutting, in particular a turning processing of a front side and/or rear side of the lens and then a polishing of the processed lens are carried out in the apparatus.

Especially preferably, the lens that is to be processed already has a finished or processed or formed side, in particular the rear side. The other side of the lens is processed shape-giving, in particular cutting (machining), in the processing device, whereby the geometric data and/or production data of the side of the lens that is to be processed are determined from the desired optical data of the lens and based on the shape of the already finished side of the lens and are used for the processing.

According to the proposal, preferably (only) directly available or present lenses are processed, in such a way that a remote transmission of lens data, common in the state of the art, and lens ordering with a glass manufacturer (can be) are no longer necessary.

Some of the previously-mentioned and subsequent aspects and features of this invention can be combined with one another in any way desired, but they can also be produced independently of one another.

Other aspects, features, advantages and properties of this invention follow from the subsequent description of a preferred embodiment in conjunction with the accompanying drawings.

DETAILED DESCRIPTION OF THE INVENTION

In the figures, the same reference numbers are used for the same or similar components and devices, whereby the same or corresponding advantages and properties follow, even when a repeated description is omitted.

The subject of the invention is an apparatus 1 for processing an optical lens 2. For the technological background of such an apparatus, reference must first be made to the introduction of the description.

The starting point for the development or processing of an optical lens 2 is a lens blank. The latter is processed (worked) by cutting processing (machining) or in other shape-giving processing and optionally in additional processing steps, in such a way that at the end, there is a finished optical lens 2 with the desired optical properties. Within the scope of this description, the term "lens" refers preferably both to the lens blank, before the necessary processing steps are performed, and to the finished lens 2, at the end.

The lens 2 or the lens blank preferably consists of plastic. However, in principle, another material that is to be processed in a suitable way, optionally also glass or mineral glass, can also be used. If the finished lens 2 is used or is to be used for eyeglasses (not shown), which preferably is the case, the lens 2 in this invention is also referred to as an eyeglass lens, even when the lens 2 optionally does not consist of glass.

The apparatus 1 according to the invention has at least one or only one processing device 3 for cutting or other shape-giving processing of the lens 2 as the workpiece that is to be processed. This processing device 3 is indicated only diagrammatically in FIG. 1.

Figure 1:
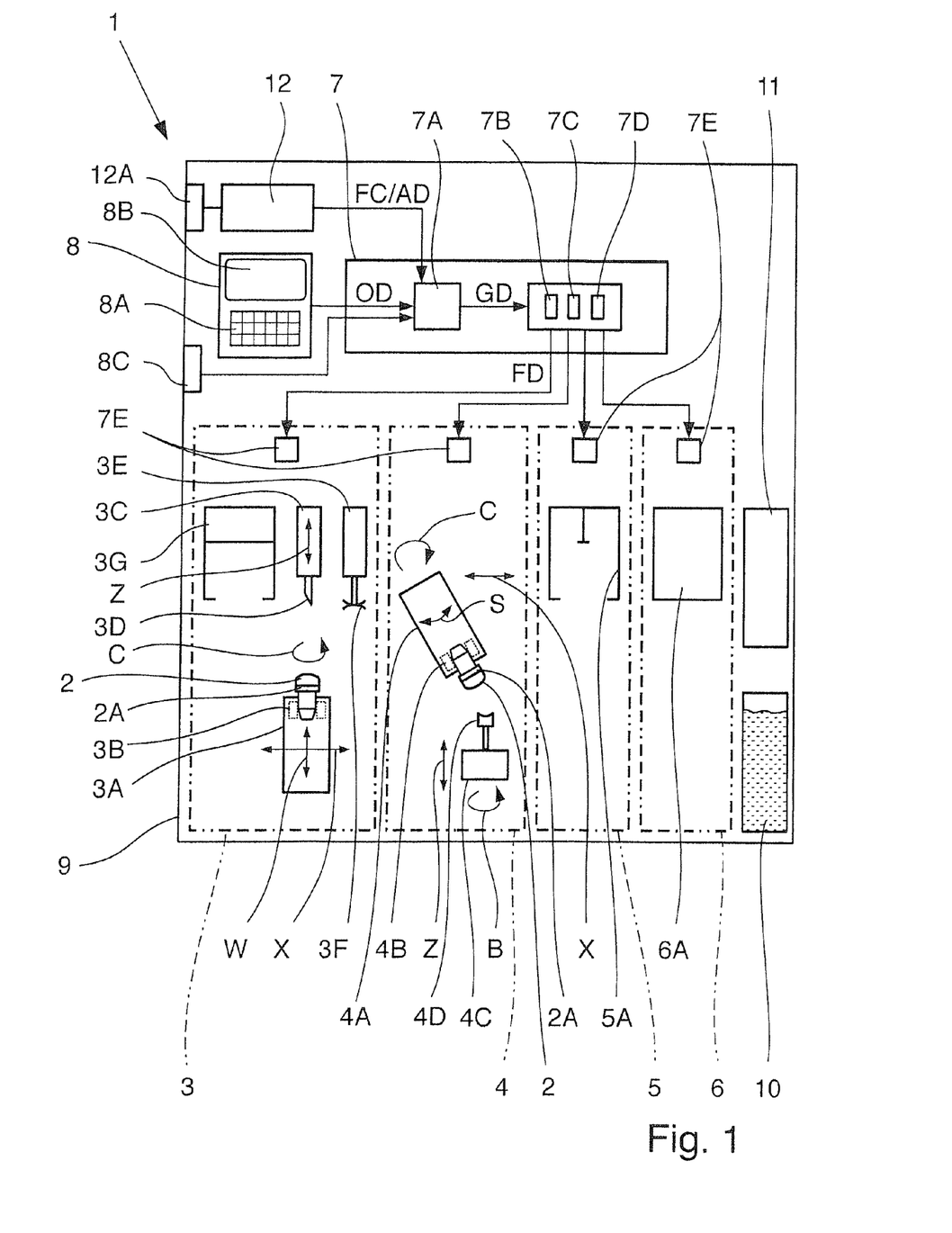
FIG. 1 shows a diagrammatic structure of a apparatus according to the proposal.

In the depicted and preferred embodiment, the processing device 3 preferably has a workpiece spindle 3A, which preferably can be moved in the W-direction and the X-direction, in particular by means of a recessed cross, which is only indicated. The two directions W, X preferably run crosswise or perpendicular to one another.

The workpiece spindle 3A is in particular a preferably direct-drive, precisely-mounted shaft or a direct drive or another drive in each case with a preferably integrated or assigned interface or receptacle 3B for the workpiece, i.e., here for the lens 2 or the lens blank. In principle, the lens 2 can be directly accommodated or clamped. Preferably, however, the lens 2 or the lens blank is held indirectly by a holding device, in particular a so-called block piece 2A. The block piece 2A is then clamped.

The lens 2 is temporarily connected to the block piece 2A. This state that is associated with the block piece 2A is referred to as "blocked" or "locked." The locking, i.e., temporary fastening, of the lens 2 to the block piece 2A can be accomplished, for example, by a preferably low-melting alloy, such as a so-called alloy block material, a resin, an adhesive, a plastic, an adhesive strip, or the like and is sufficiently known from the state of the art.

Figure 3:
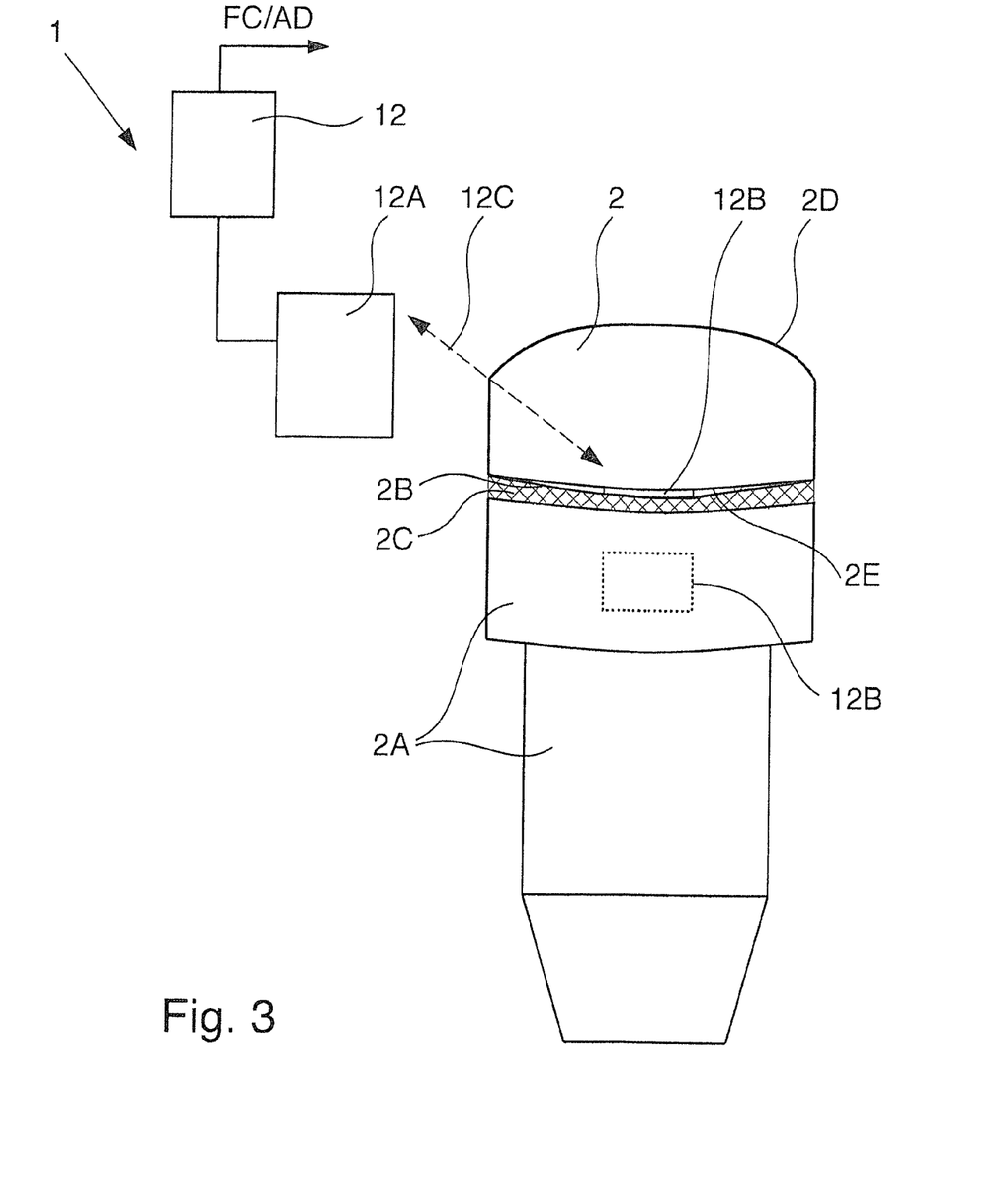
FIG. 3 shows a diagrammatic view of an acquisition device of the apparatus and a lens that is to be processed on a block piece.

In a diagrammatically enlarged view, FIG. 3 shows the lens 2 with an assigned block piece 2A according to a possible embodiment. The lens 2 is thus locked here.

The lens 2 that is to be processed has at least one optical surface or flat side, here in particular a front side 2D, that is to be processed—preferably completely. The other optical surface or flat side, here the rear side 2E, is facing the block piece 2A in the illustrative example.

The opposite side of the lens 2 that is to be processed, here the rear side 2E, is preferably already finished or already processed or shaped. In particular, this side does not need any further shape-giving processing; instead, preferably only a shape-giving processing (working) of the other side or front side 2D of the lens 2 is then done to obtain the desired optical data or properties of the lens 2. This is explained in more detail below.

In the illustrative example, as shown in FIG. 1, the workpiece spindle 3A preferably has the receptacle 3B, in particular a collet chuck, for the block piece 2A.

The clamping of the lens 2 or the block piece 2A on the workpiece spindle 3A or receptacle 3B is preferably done by hand, i.e., manually by an operator, not shown. In principle, however, an automated clamping is also possible.

The lens 2 or the block piece 2A can preferably be clamped in a specific axial position and/or rotating position to be able to process the lens 2 in a defined manner. To this end, the block piece 2A can also be constructed in several parts, as known in particular from the state of the art.

By means of the workpiece spindle 3A, the clamped lens 2 can be turned or rotated for processing. The workpiece spindle 3A thus forms in particular a rotary drive for the lens 2. The workpiece spindle 3A forms in particular a calculated or controlled rotary axis C. In particular, a CNC control unit of the workpiece spindle 3A or the rotation of the lens 2 is accomplished. Especially preferably, the lens 2 is controlled or adjusted at a specific speed and/or can be turned or rotated with a defined rotating position.

In the embodiment shown, the workpiece spindle 3A with the clamped or locked lens blank 2 can be advanced or positioned in a processing tool preferably in the W-direction and/or can be moved or transported in the X-direction crosswise to the direction of advance (crosswise feed). In particular, a controlled W-axis and X-axis or linear axes are formed. In principle, other, or additional, directions and/or movement axes are also possible. In particular, the axial orientation of the axis of rotation or rotary axis C of the workpiece spindle 3A can also run obliquely to the W-direction or to the X-direction.

The processing device 3 is preferably designed for processing (working) the lens 2 by turning, in particular facing and/or milling. However, the processing device 3 as an alternative or in addition can also make possible another—in particular cutting or shape-giving—processing of the lens 2.

In the illustrative example, the processing device 1 preferably has a drive 3C with a turning tool 3D and/or a milling drive 3E with a milling tool 3F. Here, in particular, i.e., the turning tool 3D or milling tool 3F is provided as a processing (working) tool.

The lens 2 and the respective processing tool (here, turning tool 3D or milling tool 3F) can preferably be advanced and/or moved relative to one another to make possible the respective processing.

The drive 3C is preferably a complex, preferably electrically-operating axial drive, such as a moving coil drive, or the like, in particular a so-called fast-tool drive, to control or to quickly move back and forth the turning tool 3D in particular based on the rotating position of the lens 2 and/or based on the distance of the turning tool 3D from the axis of rotation of the workpiece spindle 3A in its axial position or Z-axis. The drive 3C allows for a preferably linear and/or controlled or regulated movement of the turning tool 3D and therefore preferably forms a controlled Z-axis.

The direction of the Z-axis, on the one hand, and the direction of the W-axis or the axial orientation of the axis of rotation or rotary axis C, on the other hand, can run parallel to one another or tilted relative to one another and/or can be adjusted relative to one another. With a relative slope, the latter is preferably small enough that the preferred front-rotation for processing the workpiece or the lens 2 can still be done in the desired or necessary way.

In this invention, the term "axis" is especially preferably defined in terms of the terminology in CNC control units (digital or computer-controlled control units) as a controlled or regulated or calculated movement axis, such as a linear axis or rotary axis. This applies in particular for some or all parts of a processing device and/or multiple processing devices or for the apparatus 1 as a whole according to the proposal.

The milling tool 3F and the assigned milling drive 3E are indicated only diagrammatically in FIG. 1. The orientation of the rotational axis or axis of rotation of the milling tool 3F preferably runs crosswise or perpendicular to the axial direction of the axis of rotation or rotary axis C of the workpiece spindle 3A. Depending on requirements and design with its orientation of the axis of rotation, the milling tool 3F can also be oriented or can pivot obliquely inclined in the axial direction of the axis of rotation or rotary axis C of the workpiece spindle 3A and/or can be advanced relative to the lens 2, for example by corresponding movement of the workpiece spindle 3A and/or the milling drive 3E or the milling tool 3F.

In the depicted and preferred embodiment, the processing (working) 3 is preferably accomplished in two stages, in particular carried out with a milling tool 3F operating in a coarser mode for coarse processing (pre-processing) and a turning tool 3D operating in a finer mode for finer processing (fine processing or main processing). If necessary, however, the processing by milling can also be completely eliminated. This results in a simplification of the device 1 or processing device 3 and allows for a more compact and/or more economical structure. If necessary, the turning can also be accomplished in two steps, such as a coarser preliminary turning and later fine turning, preferably with the same turning tool 3D, but optionally also with different turning tools.

In particular, a processing can be accomplished, for example, in the processing device 3, or a structure can be provided, as described in EP 0 849 038 A2 or DE 10 2009 011 194 A2, for example.

The cutting or shape-giving processing is accomplished preferably by adding fluid, such as a cooling emulsion, or the like.

The apparatus 1, here in particular the processing device 3, preferably also has a marking device 3G, for example a laser, to mark the lens 2, for example, with corresponding data, marks, or the like. The marking device 3G is preferably depicted, constructed and/or designed as in EP 1 955 811 A1.

If necessary, a (first) edge processing of the lens 2 is also accomplished in the processing device 3. However, as an alternative or in addition, an additional processing device, not shown, such as a so-called edger, or the like, can also be provided for the edge processing.

It is also possible that the apparatus 1 or processing device 3 is designed in such a way that the lens 2 can be processed in a cutting or shape-giving way again after the actual shape-giving processing—of the optical surface(s) or flat side(s) of the lens 2, especially preferably the front side 2D—and after a coating, in particular for the edge processing of the lens 2 or finishing the edge of the lens 2.

In addition to the processing device 3, the apparatus 1 preferably has a polishing device 4 for polishing or finishing of the lens 2 or this lens blank that is processed in advance in the processing device 3. In the embodiment depicted in FIG. 1, the polishing device 4 is arranged preferably adjacent to and/or laterally beside the processing device 3.

The polishing device 4 can have a common housing with the processing device 3 or a housing that is separate therefrom.

The polishing device 4 is constructed or designed especially preferably as described in DE 10 2007 042 667 A1, whereby the polishing device 4 according to this invention can be designed, if necessary, also only for processing a lens 2 and not for simultaneous processing of two lenses 2; in particular, it can have, i.e., only one drive for rotating the lens 2.

In the illustrative example, the polishing device 4 preferably has a workpiece spindle 4A with a receptacle 4B. The workpiece spindle 4A can be constructed in principle similar to or in the same way as the workpiece spindle 3A in the processing device 3 and/or can be moved in the X-direction (crosswise feed) and/or can be pivoted as indicated by arrow S. In addition, reference is therefore made to the workpiece spindle 3A in the description. In particular, the workpiece spindle 4A is also used as a drive to rotate the lens 2 for the processing, here the polishing, and/or it serves to advance the lens 2 to a polishing tool 4D. In particular, the workpiece spindle 4A is a simple rotary drive, for example a motor with a belt drive to rotate the lens 2 for the processing or the polishing. Especially preferably, the lens 2 or the block piece 2A is mounted without a defined rotating position and/or only rotated at a constant speed (optionally controlled or regulated depending on requirements).

In principle, the polishing can also be carried out only after unblocking, i.e., after the lens 2 is detached from the assigned block piece 2A. In this case, the lens 2 is preferably directly clamped.

The clamping of the lens 2 or the block piece 2A in the workpiece spindle 4A or the receptacle 4B thereof is preferably carried out in turn by hand, i.e., manually by an operator, not shown. Accordingly, a manual reclamping from the workpiece spindle 3A to the workpiece spindle 4A is preferably also carried out. In particular, just like the clamping per se, in principle this reclamping can also be carried out in an automated manner or automatically by means of a corresponding handling or clamping device (not shown) by the device 1.

The separate drive or workpiece spindles 3A and 4A and/or receptacles 3B and 4B for the processing device 3, on the one hand, and the polishing device 4, on the other hand, make possible an independent processing (the polishing is also defined as processing, in particular as geometric or mechanical finishing of the surface) in the two devices 3 and 4, in such a way that the throughput of the apparatus 1 on the processed lenses 2 is correspondingly higher compared to a common workpiece spindle for both devices 3 and 4. However, in principle, instead of the separate or additional workpiece spindle 4A for the polishing device 4, only one or the workpiece spindle 3A can be used together for the two devices 3 and 4. If necessary, the polishing in the polishing device 4 can also be accomplished simultaneously for multiple lenses 2 at the same time and/or in multiple processing steps.

The polishing device 4 preferably has at least one polishing drive 4C with at least one assigned polishing tool 4D as a processing tool. The polishing drive 4C can turn the polishing tool 4D in particular, as indicated by arrow B.

Especially preferably, the polishing tool 4D can be pressed against or mounted on the lens 2 that is to be processed or the workpiece in particular with a predetermined force, here in the Z-direction in the illustrative example. The pressing or mounting can be accomplished, for example, pneumatically, by spring force and/or in another suitable way.

In addition or as an alternative, the polishing drive 4C or the polishing tool 4D can, if necessary, also be moved or slid in the X-direction, i.e., can form or have in particular a controlled X-axis, in particular for relative adjustment (crosswise feed) relative to the workpiece or to the lens 2.

In addition or as an alternative to the possible pivoting movement S of the workpiece drive or the workpiece, the polishing tool 4D can preferably be adapted or mounted via a corresponding joint, such as a ball joint or a gimbal joint, in its slope via a joint onto the surface of the lens 2 that is to be processed.

A single polishing drive 4C is depicted with a single polishing tool 4D. Of course, multiple drives and/or tools can also be used. In particular, the polishing drive 4C can also be designed or mounted with multiple axes. For example, the polishing device 4 can be designed or operated as described in DE 10 2007 042 667 A1.

The polishing is preferably accomplished by lapping, in particular, i.e., using a corresponding fluid containing friction elements, such as a so-called polishing milk, or the like. As an alternative or in addition, the polishing can also be done by fine grinding. In particular, instead of lapping, only a pure fine grinding can also be done for finishing the lens 2 in particular before a subsequent coating of the lens 2.

The polished or finished lenses 2 are preferably coated, in particular by means of the apparatus 1 or a coating device arranged therein (this would preferably also depict a processing device in twins of this invention) or another device (not shown).

In principle, workpieces and tools can also be replaced or mixed up in the processing work that is described, in particular in the cutting or shape-giving processing and/or in the polishing, or a kinematic reversal can be provided.

The apparatus 1 optionally further has a cleaning device 5 with a cleaning space 5A, in which the previously processed lens 2 can be cleaned. The cleaning device 5 is designed to be separate here according to the preferred teaching—i.e., separate from the devices 3 and 4. In principle, it can also be integrated into, for example, the polishing device 4.

The cleaning is preferably done manually, i.e., in a non-automated manner. For example, the still locked lens 2 or the lens 2 that is already detached from the assigned block piece 2A after the processing, in particular after the cutting processing in the processing device 3 and/or after the polishing in the polishing device 4, is cleaned, preferably washed or rinsed, in the cleaning device 5. However, if necessary, the cleaning can also be accomplished in an automated manner and/or automatically and/or using a handling device, not shown, and/or one of the workpiece spindles 3A or 4A, or crosswise slots.

As an alternative or in addition, the apparatus 1 can have an additional processing device 6, indicated by way of example, with another processing space 6A or even multiple additional processing devices 6, in particular also for different purposes or processing work. In the additional processing device 6, for example, a coating, optionally also multiple coatings, of the specially processed lens 2 can also be applied, as already mentioned.

As an alternative, a locking of the lens 2 on the assigned block piece 2A and/or an unblocking of the lens 2 and/or a processing of the lens edge and/or the block piece 2A can be accomplished in the additional processing device 6 or an additional processing device (not shown). Relative to the optional processing of the block piece 2, it is to be noted that in this connection, especially cutting processing (machining) or other shape-giving processing can be provided, for example to adapt the block piece 2A to a lens 2 that is to be processed specially, for example with an additional prism for correction of strabismus. This or another processing of the block piece 2 can be accomplished in the additional processing device 6 or an additional processing device, not shown, and/or in the processing device 3, whereby depending on requirements, an additional processing tool can also be used with an optional additional drive.

As an alternative, in the additional processing device 6 or an additional processing device (not shown), a measuring or gauging, for example, of the lens 2, an assigned eyeglass frame, a reference lens and/or a tool can be accomplished. The lens 2 can be gauged, for example, before and/or after a processing or a processing step. For example, a processed side, the front side and/or rear side of the lens 2 and/or an edge or edge path or outer edge path of the lens 2 can be measured or gauged. In the case of an eyeglass frame, for example, the shape of the frame, the inside contour for accommodating the eyeglass lenses, and/or the distance from the eyeglass lenses can be measured.

The apparatus 1 has a control device 7 in any case for controlling the shape-giving processing of the lens 2 or the processing device 3 and, once there, the polishing device 4. The control device 7 can also control additional devices 5 and 6 of the apparatus 1. The control device 7 is diagrammatically indicated in FIG. 1. Details of the control device 7 are further explained below.

The control device 7 is provided or connected on the input side with an input device 8 of the apparatus 1, which is configured in such a way that the desired optical data OD of the lens 2 can be input directly. The optical data OD, which are input with the input device 8, are relayed to the control device 7, which determines preferably geometric data GD of the lens 2 therefrom and/or determines or generates lens-production data FD.

In the embodiment, the input device 8 preferably has a control panel 8A for manual input of the desired optical data OD and/or a display device 8B, here in the form of a screen, in particular for user guidance. If necessary, the input device 8 can also have a touchscreen as an alternative or in addition to the control panel 8A for input of the desired optical data OD. This touchscreen can, if necessary, be formed by the display device 8B and/or an additional screen. It is important that the input device 8 be designed in such a way that the optical data OD can be input in a simple, easily comprehensible way.

The display device 8B preferably uses user guidance in the input of desired optical data OD and/or for an (easy) operation of the apparatus 1. The apparatus 1 especially preferably has only a single display device 8B or only a single screen to make possible a simple, economical structure and/or to make possible or to facilitate an especially simple operation, even by at least largely unskilled staff.

In the display device 8B, a dialog box preferably can be in particular a touchscreen. Then, the control panel 8A, which is indicated as a keyboard in FIG. 1, is in actuality integrated into the screen 8B. Of course, a rather traditional configuration with a (separate) keyboard as a control panel 8A is also possible as well.

A variant in which the input device 8 has an interface 8C, in particular for an electronic input or receptacle of the desired optical data OD, is also indicated in FIG. 1. In this connection, for example, this can be a card reader, a wireless interface, or an electrical connection, such as a USB interface.

The apparatus 1 or control device 7 preferably has a design module 7A for determining or generating geometric data GD and/or production data FD from the desired optical data OD. FIG. 1 can detect how the optical data OD from the input device 8 preferably are relayed to a first stage of the control device 7, namely to the design module 7A. In the depicted and preferred embodiment, the design module 7A contains (at least) one design model, with whose assistance geometric data GD of the lens 2 to be produced are developed or generated from the input optical data OD in a determination process. The design model or a group of preferably stored design models results in particular in the design module 7A preferably with the structure of algorithms explained in the general part of the description or by an approximation, interpolation, or the like to form the geometric data GD of the lens 2.

The desired optical data OD were already explained or defined in the general description of the invention, in such a way that a repetition in this connection is unnecessary. The same is also true in particular for the geometric data GD, the production data FD, the output data AD, and an activation code FC.

From the desired or input optical data OD, the geometric data GD in a first step and the production data FD in a second step or, as an alternative, also directly the production data FD—optionally also different production data FD for different processing steps—are established, determined and/or generated by the device 1, by the control device 7, and/or by means of the design module 7A or design model. In this connection, in particular also the output data AD of the lens 2 that is to be processed or the lens blank that is to be processed, such as lens type, size, shape, thickness, lens material, refractive index, shape of an already finished side, such as the rear side 2D and/or the type of binding, or the like, are taken into consideration. If necessary, these output data AD can be input and/or selected in particular via the input device 8 and/or interface 8C, as indicated in FIG. 1, or in another way, and/or automatically acquired or determined by the apparatus 1 or control device 7. In particular, the control device 7 or the design module 7A can select a corresponding or suitable design model based on these output data AD.

As an alternative or in addition, the apparatus 1 or the control device 7 and/or the design module 7A can be designed in such a way that based on the optical data OD and/or the geometric data GD resulting therefrom, a lens 2 or the optimum lens blank or lens type—in particular from a preset or presettable group of available lenses 2 or lens blanks or types—can be selected automatically and optionally can be indicated in particular to the operator.

The operator can then clamp the corresponding lens blank in the first processing device, here the processing device 3 or its workpiece spindle 3A or its receptacle 3B. If the required lens blank specifically should not be available, the operator can input the latter preferably so that then another suitable lens blank can be requested from the device 1 or control unit 7. However, other processes or user guidance are also possible here. It is to be noted that the term "user guidance" in particular comprises the guidance of an operator, not shown, especially preferably via the display device 8B or other devices, with respect to the operation of the device 1 and/or supplying resources, tools, or the like.

The design model can be preset, input and/or changed; this depends in particular on the configuration of the control device 7 or the design module 7A. Preferably, a specific group of design models is stored in the device 1, in the control device 7, or in the design module 7A, and can be selected from these design models, if necessary.

The determination of the lens data or geometric data GD from the optical data OD is accomplished according to the preferred teaching, in such a way that for each lens 2, a particular determination process for the geometric data GD or production data FD is carried out. A separate determination process for determining the geometric data GD from the optical data OD or, directly, the production data FD from the optical data OD for each individual lens 2 is of special importance, also to be able to generate an unambiguous accounting. Each determination process of geometric data GD or production data FD is preferably counted and cleared and/or only carried out as a separate determination process when a corresponding activation code FC or another release or the like is present. The device 1 or control device 7 or the design module 7A is preferably designed in such a way that a determination process is carried out only after a corresponding release and/or each determination process is counted and/or cleared. The input or acquisition of a corresponding activation code FC can be accomplished in particular via the input device 8 or the interface 8C or in another suitable way. The detection or input of an activation code FC and/or output data AD or information in the above-mentioned sense is accomplished especially preferably by means of a detection device 12 of the apparatus 1, as indicated in FIG. 1. This will be considered later on in more detail.

According to preferred teaching, the apparatus 1 or the control device 7 preferably further has a production module 7B, with which the production data FD for the processing device 3 and optionally also for the polishing device 4 are now generated from the specific geometric data GD of the lens 2. Also, for the additional processing devices 5 or 6 of the device 1, the corresponding production data FD can be generated by means of the production module 7B.

In addition, in the depicted embodiment, a distribution of the production data FD is preferably carried out in various processing steps. This can be accomplished, for example, via a sequence control unit 7C, indicated in FIG. 1, of the apparatus 1 or control unit 7 or in some other way, optionally by means of additional control devices.

In the apparatus 1 or control device 7, a user guide device 7D can also be integrated, which then makes possible—in particular via the display device 8B of the input device 8—the feedback to the user or operator or the user guidance.

In principle, it is also possible to be able to produce or to generate the production data FD without the intermediate step of the geometric data GD of the lens 2 directly from the desired optical data OD of the lens 2, as already mentioned. This depends in particular on the configuration and/or programming of the apparatus 1 or control device 7.

In the depicted and preferred embodiment, each individual device 3, 4, 5 and 6 preferably has its own assigned device control unit 7E. These device control units 7E are integrated in the depicted and preferred embodiment, preferably into the respective devices 3, 4, 5 and 6. They can also, however, be integrated at least partially or completely into the control device 7 or other components of the apparatus 1 or can be formed therefrom. Usually, the device control units 7E are CNC control units.

In general, it is to be noted that the control device 7 can be formed by or can contain a memory-programmable control unit, CNC control unit (digital or computer-supported control unit), or the like, and/or can control such a control unit. The control device 7 or parts of the control unit can also be combined arbitrarily for the devices 3 to 6 and/or divided arbitrarily among the devices 3 to 6 or can be formed only by the latter.

The depicted and preferred embodiment shows the apparatus 1 as a compact processing center, here and according to preferred teaching in or with a common housing 9. As a result, the apparatus 1 according to the invention can be installed preferably completely with all devices on a suitable spot. In particular, here, this is a compact apparatus 1 in the form of a processing center that can be set up on any site.

Preferably, the control device 7 and/or the input device 8 is/are firmly embedded, integrated or thus firmly connected and/or firmly attached thereto—in particular via a cable, not shown—in the apparatus 1 or its housing 9.

The depicted and preferred embodiment also shows, diagrammatically indicated in FIG. 1, another tank 10, in which a necessary fluid, for example a polishing agent, a cleaning fluid, a cooling lubricant, or the like, can be stored. Consequently, the tank 10 can also be divided, if necessary. The tank 10 can also be formed or supplemented by multiple individual tanks that are separate from one another.

Finally, FIG. 1 also shows, diagrammatically indicated, another receiving device 11, which can be used, for example, for storing tools, block pieces, lens blanks, or the like.

According to the preferred teaching of the invention, the apparatus 1 can also be configured in such a way that the state of the apparatus 1 and/or individual devices 3 to 7, 12 of the apparatus 1 and/or other informational data, such as the number of determination processes, the type or number of the processed lenses 2, or the like, can be queried and/or influenced from afar. This uses in particular monitoring or maintenance, but in particular it is not intended for the continuous operation of the apparatus 1. To this end, corresponding interfaces can then be provided for connection to the Internet, to a telephone network or a radio network (for example, via a preferably integrated GSM module) or some other network. In this connection, the interface 8C optionally also can be used.

Figure 2:
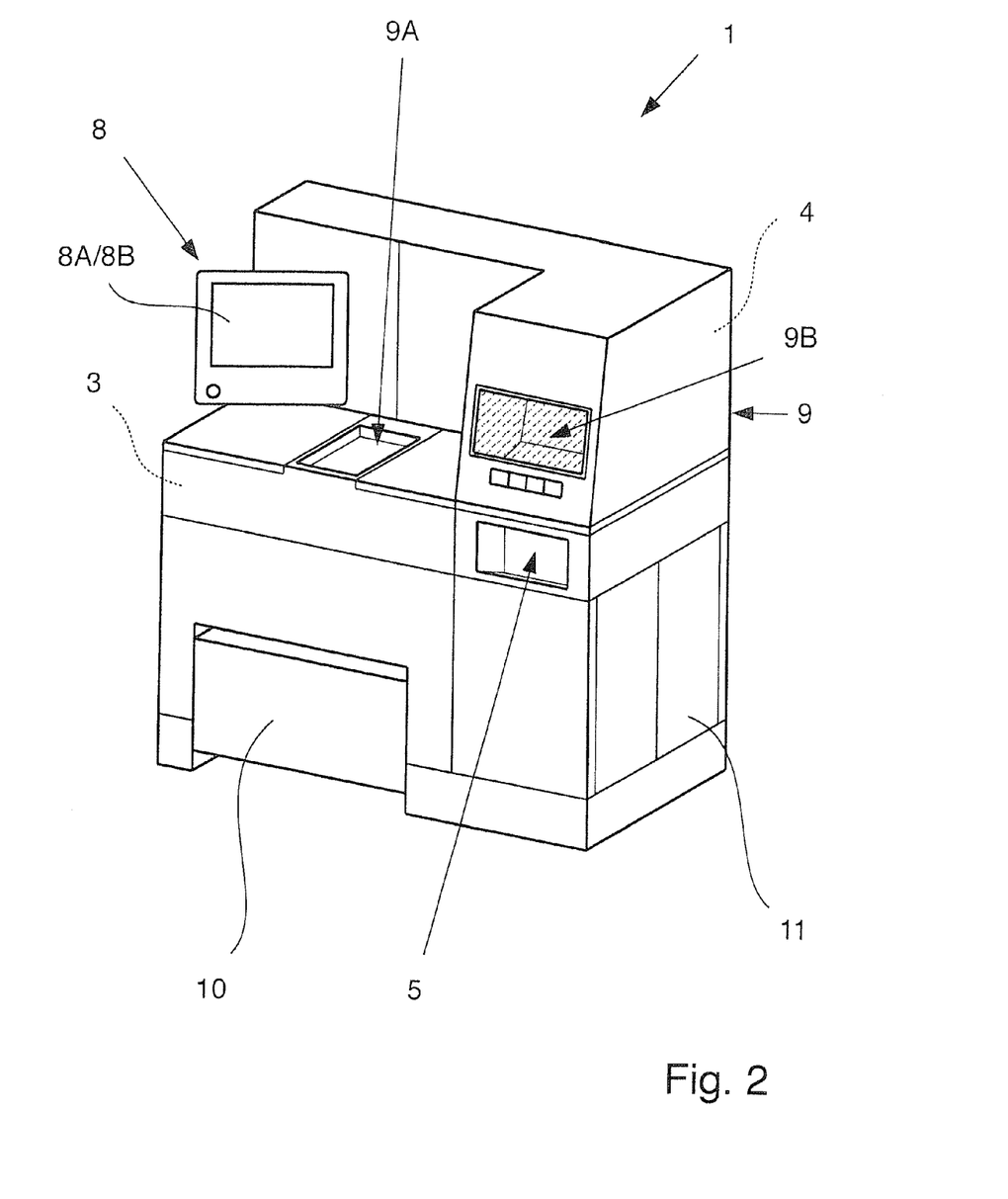
FIG. 2 shows a diagrammatic view of the apparatus.

In a diagrammatic, perspective view, FIG. 2 shows the apparatus 1 according to the invention in a possible configuration in the form of a processing center in the compact housing 9. The housing 9 preferably has an input flap 9A for the processing device 3, here only indicated, that is located in particular below in the housing 9. The polishing device 4 is preferably arranged on the right in the housing 9. An input flap 9B for the polishing device 4 is provided on the housing 9 in the front in the area of the polishing device 4. As an alternative, the input flap 9B can also be arranged, for example, beside the input flap 9A at least essentially at the same height or in a common plane and/or with an at least essentially identical orientation, whereby the polishing device 4 then is arranged preferably under it and not behind it.

Based on the representation in FIG. 2, it can be seen that the reclamping of a lens 2 or a lens blank with its block piece 2A from the processing device 3 is preferably accomplished manually in the polishing device 4 by an operator.

An opening of the cleaning device 5 is preferably arranged below the input flap 9B or the polishing device 4 or at some other suitable spot. The tank 10 is indicated or arranged preferably below on the housing 9. The input device 8 with the display device 8B and/or the control panel 8A, here in particular in the form of a touchscreen, is preferably located on the top left on the housing 9.

The apparatus 1 or its housing 9 preferably also has the receiving device 11, in particular for tools, block pieces 2A, lenses 2, or lens blanks, and/or other resources. The receiving device 11 here in the illustrative example is preferably arranged laterally.

As already mentioned, the apparatus 1 preferably has an acquisition device 12 for acquiring information, in particular an activation code FC for the determination of geometric data GD and/or production data FD of the lens 2 from the desired optical data OD of the lens 2 and/or for acquiring lens-specific output data AD. The acquisition device 12 can be integrated in particular into the input device 8 or formed by the latter, as already mentioned. Preferably, the acquisition device 12, however, is a separate device that is especially preferably integrated in turn into the apparatus 1, or firmly connected to the latter, and/or in particular is attached or can be attached firmly to the latter.

The apparatus 1 or acquisition device 12 preferably has a detection device 12A for acquiring the information or an activation code FC and/or the output data AD. For example, the latter can have a read head, a sensor, a camera, or the like or can be formed in this way.

The detection device 12A is preferably integrated into the apparatus 1 or acquisition device 12 or firmly connected to the latter and/or in particular is firmly attached or can be attached to the latter.

The acquisition device 12 or detection device 12A is designed in particular in such a way that the information or an activation code FC or the output data AD can be acquired, read and/or detected optically, magnetically, electromagnetically and/or in some other suitable way. The data detected or acquired by the detection device 12A are processed, for example, by the acquisition device 12, in particular to the extent that the information or an activation code FC and/or output data AD are output and in particular are passed on to the device 1 or the control device 7 or to other components or devices, as is diagrammatically indicated in FIG. 1. In particular, the acquisition device 12 can control the detection device 12A in a suitable way.

The acquisition device 12 or detection device 12A can be arranged separately from the other devices of the device 1 or assigned to a device, in particular the processing device 3, or a receptacle 3B or 4B, or arranged thereon or therein.

In particular, the apparatus 1 or the acquisition device 12 or the detection device 12A is designed in such a way that the information relative to the respective lens 2 that is to be processed can be acquired automatically or in an automated manner, for example if the lens 2 (in particular together with the assigned block piece 2A) is brought into the vicinity of the detection device 12A and/or is fed to the receiving device 11 or is removed, and/or is received by one of the processing devices 3 to 6 of the apparatus 1 and/or is received or clamped in one of the receptacles 3B or 4B. The acquisition device 12 or its detection device 12A is then, if necessary, preferably accordingly arranged in the vicinity or integrated therein.

If necessary, the apparatus 1 can also have several detection devices 12A, which are assigned, for example, various processing devices 3, 4 or other devices 5, 6 of the apparatus 1, in particular to be able to examine or verify, based on the information acquired or detected in each case, that the correct lens 2 was used and/or the correct processing or treatment was carried out.

The information can be used in particular also for an identification of the respective lens 2 before and/or during and/or after the processing.

The information or an information medium that is provided with the information is/are assigned in each case to the lens 2 or the block piece 2A, in particular arranged thereon or applied thereto or integrated therein. Corresponding variant embodiments are explained in more detail below based on the additional figures.

In a diagrammatic representation, FIG. 3 illustrates an acquisition of information relative to a lens 2 or a lens blank that is to be processed by means of the acquisition device 12 and the detection device 12A.

The lens 2 is preferably provided with the information, in particular an activation code FC and/or (lens-specific) output data AD; an information medium 12B is especially preferably provided with this information and assigned to the lens 2.

The information medium 12B is in particular an RFID chip or RFID transponder, a mechanical and/or optical identification, in particular a bar code, especially preferably a two-dimensional bar code, another identification, another identification means, or the like.

The information medium 12B contains the information, if necessary, in coded or uncoded form. In particular, at least the especially preferred activation code FC contained therein and/or a preferably an unambiguous identification of the respective lens 2 is coded.

The information or data that contain the information is/are acquired or read by the acquisition device 12 or detection device 12A, in particular via a corresponding signal exchange or a detection signal 12C, as indicated diagrammatically in FIG. 3. These data are then preferably evaluated in the apparatus 1 or acquisition device 12 in particular relative to the information or activation code FC and/or the output data AD and are made available in particular for further processing or for the additional operation or process of the apparatus 1 or for other components or devices of the device 1, such as the control device 7.

The above-mentioned detection, reading or acquisition of data from the information medium 12B is accomplished in particular optically, by radio, magnetically, electromagnetically and/or in some other suitable way. For example, an RFID chip or RFID transponder as an information medium 12B is read out by radio or via an RFID signal. For example, an optical identification or a bar code is optically acquired or scanned as an information medium 12B. For example, the information medium 12B can also be another chip or microchip, in particular an EPROM or EEPROM, and/or a magnetic data storage device, or the like. The apparatus 1 or acquisition device 12 or detection device 12A is designed accordingly, for example with a corresponding RFIF receiver or scanner, a camera, another sensor, or the like.

The information medium 12B can, for example, be firmly connected to the lens 2 or applied to the latter, optionally in an area that is removed during the processing.

In the illustrative example, the lens 2 is preferably provided with a protective film 2B, in particular on its rear side facing the processing side. This rear side is usually already processed. The protective film 2B therefore uses a protection of this processed rear side in the further processing of the lens 2 on the other side or front side and/or in the processing of the edge of the lens 2. In particular, the protective film 2B protects the rear side of the lens 2 in the blocked state against damage, or the like. FIG. 3 shows the lens 2 in the blocked state. The assigned block piece 2A is connected in particular by means of a block material 2C, which is diagrammatically indicated in FIG. 3, with the lens 2, more precisely with the rear side of the lens 2 or the protective film 2B.

In the illustrative example, the information medium 12B is preferably formed by the protective film 2B or integrated into the latter or connected to the latter, in particular in such a way that in a subsequent detaching of the protective film 2B from the lens 2, the information medium 12B is also detached (by force) from the lens 2 and/or destroyed. As an alternative, the information medium 12B can also form the protective film 2B or vice versa.

The information medium 12B can, as only diagrammatically indicated in FIG. 3, be arranged as desired on the side facing the lens 2 or on the side of the protective film 2B that is facing away therefrom. In general, the information medium 12B is then preferably designed very flat so that in particular no arching of the protective film 2B takes place. Optionally, the information medium 12B can also be embedded in a corresponding recess, or the like.

In the illustrative example, there is especially preferably an RFID chip or RFID transponder, designed like a film, as an information medium 12B; this can be inseparable in particular with the protective film 2B and/or exclusively connected, especially preferably glued or welded or laminated therein. However, other structural solutions are also possible.

As an alternative, the information medium 12B can also be arranged on the block piece 2A or integrated into the latter, as indicated by dotted lines in FIG. 3.

Figure 4:
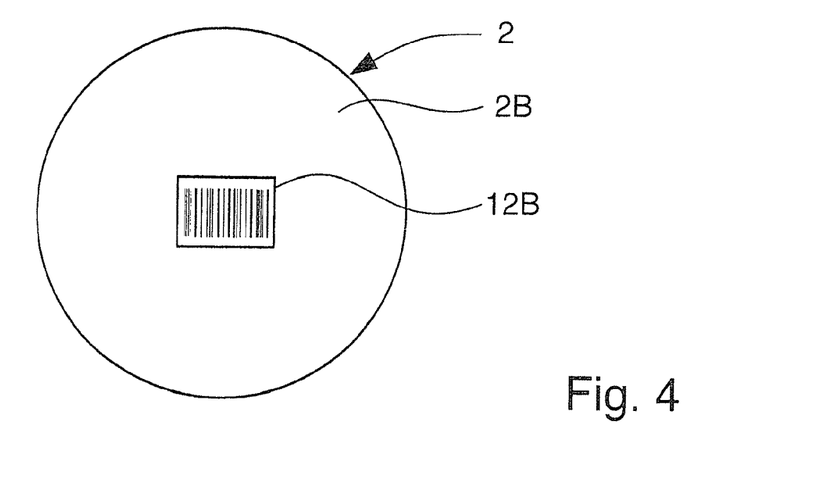
FIG. 4 shows a diagrammatic top view of the lens with a protective film and an information medium.

In a diagrammatic top view, FIG. 4C shows the lens 2 with the protective film 2B, but in the unlocked state, i.e., separate from the block piece 2A. The information medium 12B that is assigned to the lens 2 or protective film 2B is arranged here in particular in the middle and/or designed as a bar code.

After the unblocking and/or processing of the lens 2 and/or after the lens 2 is coated, the protective film 2B is preferably removed only together with the information medium 12B from the lens 2.

The information medium 12B is preferably arranged and/or designed in such a way that the latter is of no use or unreadable, in particular destroyed, after being read for the first time and/or during the processing and/or after the processing.

Preferably, the information or activation code or parts thereof are made unusable or unreadable or deleted after being read, used, acquired, or the like, and/or after the determination of the geometric data GD and/or the production data FD. For example, a magnetic or electric or electronic deletion of information or of the information medium 12B can be carried out. The information medium 12B is then preferably designed correspondingly. For example, this can also be a microchip, EPROM, EEPROM, magnetic storage device, magnetic data medium, or the like. As an alternative, a deletion or destruction of information or of the information medium 12B can be done by the marking device 3G or optically or by the action of a storage device, UV radiation, or the like.

Preferably, the apparatus 1, control device 7 or acquisition device 12 is designed in such a way and/or is provided with a comparing means, such as a comparator, with a program or the like, to check whether an acquired activation code FC is a permissible activation code FC. This is accomplished in particular by comparing an activation code FC that is acquired by means of the acquisition device 12 (or input in some other way) with a permissible activation code FC. These permissible activation codes FC are stored or can be generated in particular in the apparatus 1, for example by a program or an algorithm, or filed in a suitable data storage device, or the like, which the apparatus 1 can access. Only in the case where the acquired or input activation code FC coincides with one of the permissible activation codes is the acquired or input activation code FC seen as a permissible activation code FC, and a determination process, i.e., a determination of geometric data GD and/or production data, is allowed or made possible.

Preferably, a determination process is carried out only after a corresponding or permissible activation code FC is acquired. Especially preferably, each activation code FC is permissible or usable only once or can be used only for a single determination process and/or can be used only in connection with a single specific lens 2. As an alternative or in addition, when using the activation code FC, preferably an identification is assigned to the thus processing lens 2, and a repeated use of the activation code FC is ruled out for another lens 2. The apparatus 1 or control device 7 is preferably designed in such a way as to make possible the above-mentioned functionality or functionalities.

Preferably, a particular determination process is provided for each lens 2, and a particular activation code FC is necessary.

Preferably, the design model can be selected from several design models by the activation code FC and/or the output data AD.

Preferably, the processing of the respective lens 2 and/or the generation of geometric data GD and/or the determination of production data FD is carried out only when a permissible activation code was present or acquired.

Especially preferably, activation codes FC that were already used are stored optionally together with the identification of the processed lens 2 to be able to prevent repeated use or reuse.

Especially preferably, only unambiguous activation codes FC are used, which are different for each lens 2. However, special activation codes FC can also be provided for multiple lenses 2 or lens types or a group of lenses 2, which make possible a corresponding repeated use or consequently multiple determination processes for the lenses 2.

As an alternative or in addition to the use of the activation code FC, the information or output data AD can be used in particular for an identification or differentiation of the lens 2 for checking whether the correct lens type is used, or the like, and/or for other purposes. The information or output data AD therefore preferably also contain(s) an unambiguous identification of the respective lens 2 or the respective lens type, or the like.

In principle, it is also possible to distribute the information, for example the activation code FC on the one hand and the output data AD on the other hand, to various information media 12B and/or to various types of acquisition, for example acquisition via the acquisition device 12 or its detection device 12A on the one hand and the input device 8 on the other hand, and/or to an automatic acquisition on the one hand and a manual acquisition or input on the other hand. In addition, various types of acquisition, for example, on the one hand, optical, and, on the other hand, magnetic or electromagnetic, can also be used in mixed form.

Figure 5:
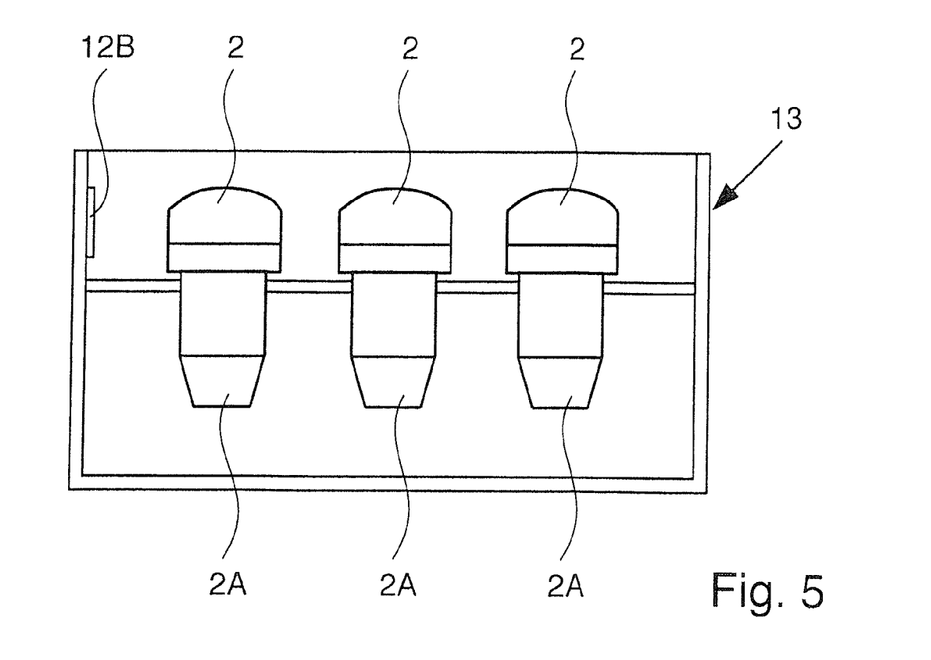
FIG. 5 shows a diagrammatic, section-like view of a shipping container for one or more lenses with an information medium for the apparatus.

In a very diagrammatic representation, FIG. 5 shows a shipping container 13, according to the proposal, for one or more lenses 2, in particular locked lenses 2, i.e., lenses 2 with block pieces 2A. If necessary, as an alternative or in addition, the shipping container 13 can contain tools 3D, 3F and/or 4D, for example various tools for various processing work or lenses 2 and/or tools for replacement and/or other operating means, such as coolant, polishing agents, coating agents, cleaning agents, block material, or the like, and/or other aids, such as gloves, cleaning cloths, or the like.

The shipping container 13 is especially preferably a container that supplies the user or the apparatus 1 in particular with all lens blanks, materials and/or information, or the necessary activation code, or the like, that are necessary for the processing. As an alternative or in addition, the information or activation code or parts thereof can also be relayed or provided in some other way, for example by e-mail, SMS, electronic message, telephone, fax, Internet request, radio, or the like.

In the illustrative example, the shipping container 13 is preferably provided with the information or an information medium 12B. This information or these information media 12B can contain, for example, an activation code FC for all lenses 2 supplied with the shipping container 13 or contained therein or multiple corresponding activation codes FC and/or in a corresponding way output data AD relative to the lenses 2.

The information medium 12B can be connected firmly or inseparably to the shipping container 13. As an alternative, the information medium 12B can also be detachable therefrom and, for example, insertable into the acquisition device 12 or its detection device 12A or attachable thereto, in particular for reading the information contained therein.

The reading of the information or information medium 12B of the shipping container 13 can also be carried out, for example, in that the shipping container 13 is received by the apparatus 1 or its receiving device 11. In this case, the shipping container 13 or the information medium 12B, for example, can be read by corresponding electrical connections or the like, or can be connected to the apparatus 1 or acquisition device 12 or detection device 12A or can be attached thereto.

It is also possible that in addition, a particular information medium 12B is assigned in each case to the individual lenses 2 in the shipping container 13, so that for processing the respective lens 2, in particular both this assigned information medium 12B and the information medium 12B assigned to the shipping container 13 or the information contained therein in each case are necessary.

In general, a distribution of the information or activation code to various information media 12B and/or various types of acquisition or various acquisition devices can thus be carried out.

As an alternative or in addition, an activation or release of the apparatus 1 for a determination of, for example, geometric data GD and/or production data FD and/or for a processing (additional) can be made dependent thereon, so that corresponding requirements are tested or fulfilled, such as the insertion of a specific or necessary lens type or lens blank, provision of necessary processing tools, or the like, and/or corresponding (optionally to be input manually) confirmations by a user or from outside by a third party, or the like.

In general, it is also possible to delete the information or activation code or parts
thereof after the acquisition or the use thereof. As an alternative or in addition, the information medium 12B can be at least partially destroyed or made unusable.

What is claimed is:

1. Apparatus for processing an optical lens,
    with a processing device for cutting or other shape-giving processing of at least one of a front side and rear side of a particular lens to be processed based on geometric or production data,
    wherein the apparatus or a control device of the apparatus has or uses a design module, the design module comprising a design model adapted to receive desired optical data for determining the geometric or production data relating to characteristics of a particular lens for processing of said at least one of the front side and rear side of a particular lens, the apparatus further comprising an acquisition device adapted for acquiring an activation code necessary for use of the design model wherein the apparatus, control device or design module is adapted to check whether the activation code is for enabling determining of the geometric or production data by said design model based upon the desired optical data of the lens only after acquisition of an activation code that is permissible, and wherein the design model uses or is adapted to receive the optical data for a particular lens, and the activation code is required for using the design model for determining the geometric or production data for the lens without the activation code being specific for a particular lens.

2. Apparatus according to claim 1, wherein the design model can be selected from several design models by at least one of the activation code and lens-specific output data of the lens.

3. Apparatus according to claim 1, wherein the determination of geometric data or production data for a lens is acquired as a determination process.

4. Apparatus according to claim 3, wherein for each lens, a particular determination process is provided and a particular activation code is necessary.

5. Apparatus according to claim 3, wherein the activation code can be used only for a single determination process.

6. Apparatus according to claim 1, wherein the acquisition device is designed for optical acquisition of an activation code.

7. Apparatus according to claim 6, wherein the acquisition device has a detection device for optical reading of an information medium or a bar code for acquiring an activation code.

8. Apparatus according to claim 1, wherein the acquisition device is designed for electromagnetic acquisition of an activation code.

9. Apparatus according to claim 8, wherein the acquisition device has a detection device for electromagnetic reading of an information medium or an RFID transponder.

10. Apparatus according to claim 1, wherein the processing device has a receptacle for a block piece of the lens, so that the latter—locked on the block piece—can be inserted or clamped and processed in the processing device.

11. Apparatus according to claim 10, wherein the block piece is provided with an activation code for the assigned lens, and the acquisition device is designed or arranged for its acquisition.

12. Apparatus according to claim 10, wherein the block piece is provided with the output data for the assigned lens, and the acquisition device is designed or arranged for the acquisition thereof.

13. Apparatus according to claim 1, wherein the apparatus or acquisition device is designed for acquiring lens-specific output data.

14. Apparatus according to claim 1, wherein the apparatus has an input device, which is configured in such a way that at least one of the desired optical data of the lens, the activation code and the output data for the lens, that is to be processed, can be input directly.

15. Apparatus according to claim 1, wherein at least one additional activation code is provided, wherein the activation codes are formed in different places and each consists of alphanumeric characters.

16. Apparatus according to claim 1, wherein multiple permissible activation codes are filed or stored in the apparatus or can be generated by means of an algorithm.

17. Apparatus according to claim 16, wherein the apparatus has a comparing means to compare an activation code that is acquired by means of the acquisition device with the permissible activation code.

18. Apparatus according to claim 17, wherein the apparatus is designed in such a way that in the case where the acquired activation code coincides with one of the permissible activation codes, the determination of the geometric data or production data for the assigned lens is allowed.

19. Apparatus according to claim 17, wherein the apparatus is designed in such a way that in the case where the acquired activation code does not coincide with one of the permissible activation codes, the determination of the geometric data or production data for the assigned lens is not allowed.

20. Apparatus according to claim 1, wherein a (permissible) activation code can be used only once to determine the geometric data or production data for one lens, but not for any other lens.

21. Apparatus according to claim 1, wherein the apparatus is designed as a compact processing center with an integrated acquisition device and with an integrated design module for determining the geometric data or production data from the desired optical data in the case of previous acquisition of a permissible activation code.

22. Apparatus according to claim 1, wherein the processing device is designed for at least one of cutting, turning and full-surface processing of the front side or rear side of the lens based on the geometric data or production data that are determined from the desired optical data.

23. Apparatus according to claim 1, wherein the processing device is designed for the production of a free-form surface on the front side or back side of the lens.

24. Optical lens for processing in a device with a processing device for cutting or other shape-giving processing of at least one of a front side and rear side of the lens, wherein the lens is provided with an activation code for determining geometric data or production data of the lens from the desired optical data of the lens, wherein the lens is assigned an information medium with the activation code, wherein the information medium is arranged in an area of the lens on said at least one of the front side and rear side of the lens that is destroyed or removed in the processing, wherein the activation code provides data required for calculating geometric/production data for the lens without being specific for a particular lens, said data being adapted for use by a design module with a design model having optical data for production or processing of said at least one of the front side and rear side of a particular lens to be produced.

25. Lens according to claim 24, wherein the information medium contains an RFID transponder or is formed thereby.

26. Lens according to claim 24, wherein the information medium contains an optical code or bar code or is formed thereby.

27. Lens according to claim 24, wherein the information medium is provided with lens-specific output data of the assigned lens.

28. Lens according to claim 24, wherein the lens is provided with lens-specific output data.

29. Lens according to claim 24, wherein the lens is provided with a protective film, and the protective film is provided with the activation code.

30. Lens according to claim 24, wherein the lens is blocked with a block piece.

31. Lens according to claim 30, wherein the block piece or an information medium that is arranged thereon or therein is provided with the activation code.

32. Method for processing an optical lens whereby the lens that is to be processed is fed to an apparatus, and desired optical data of the lens are input into the apparatus,
- whereby an activation code necessary for use of the apparatus for processing of the optical lens is acquired,
- whereby the acquired activation code is compared to permissible activation codes,
- whereby only in the case where the compared acquired activation code coincides with a permissible activation code are geometric data of the lens determined from the desired optical data by means of a design module, and production data are generated therefrom or production data are generated directly,
- whereby then a front or rear side of the lens is processed based on the thus generated production data of the device to achieve the desired optical data in the lens
- wherein the activation code provides data required for calculating geometric/production data for the lens without being specific for a particular lens, said data being used by a design module with a design model having optical data for production or processing of said at least one of the front side and rear side of a particular lens to be produced.

33. Method according to claim 32, wherein the lens or the front side or back side thereof is/are processed by cutting or turning in the apparatus.

34. Method according to claim 32, wherein the lens is polished after the processing in the apparatus.

35. Method according to claim 32, wherein the desired optical data are input manually via an input device of the device.

36. Method according to claim 32, wherein the desired optical data are input or recorded electronically.

37. Method according to claim 32, wherein the geometric data and/or production data are determined or generated from the desired optical data by means of a design model.

38. Method according to claim 37, wherein the design model is selected from multiple design models—in particular automatically or based on available lenses or lens blanks or types, or lens manufacturers.

39. Method according to claim 32, wherein the determination of geometric data or generation of production data from the optical data is at least one of evaluated, acquired, stored and counted altogether as a determination process.

40. Method according to claim 32, wherein the geometric data or production data of the front side of the lens are determined or generated based on the desired optical data and based on the shape of the rear side of the lens.

41. Method according to claim 32, wherein the front side of the lens is processed based on the desired optical data and based on the shape of the rear side of the lens in the apparatus.

42. Method according to claim 32, wherein the determination of the geometric data is integrated into the apparatus and is carried out in particular without remote data transmission or without external data exchange.

* * * * *